(12) United States Patent
Chameroy et al.

(10) Patent No.: US 6,425,320 B1
(45) Date of Patent: Jul. 30, 2002

(54) DEVICE FOR LOCKING/UNLOCKING A PRESSURE COOKER WITH LUG-BAYONET TYPE CLOSURE

(75) Inventors: Eric Chameroy, Véronnes; Eric Christian Jacques Rhetat; Eric Laurent Baraille, both of Dijon, all of (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 09/554,934
(22) PCT Filed: Sep. 27, 1999
(86) PCT No.: PCT/FR99/02293
§ 371 (c)(1),
(2), (4) Date: Jul. 5, 2000
(87) PCT Pub. No.: WO00/18277
PCT Pub. Date: Apr. 6, 2000

(30) Foreign Application Priority Data

Sep. 28, 1998 (FR) .............................................. 98 12259

(51) Int. Cl.⁷ ........................ A47J 27/08; A47J 27/092; B65D 45/00
(52) U.S. Cl. ........................ 99/337; 99/403; 126/373.1; 219/440; 220/912; 220/573.1; 220/293; 220/315
(58) Field of Search ........................ 99/337, 403, 338, 99/330, 340, 342, 449; 220/573.1, 203.01, 315, 316, 324, 325, 327, 203.09, 203.19, 203.22, 912, 378, 291, 293, 323; 292/DIG. 11, 57, 58, 63, 65, 66, 139, 140, 251; 126/373.1

(56) References Cited

U.S. PATENT DOCUMENTS 2,538,567 A * 1/1951 Jones .......................... 220/293
4,434,909 A * 3/1984 Ott .............................. 220/316
5,442,998 A * 8/1995 Niese .......................... 99/337

FOREIGN PATENT DOCUMENTS

| DE | 1779501 | 12/1971 |
| DE | 2211644 | 9/1973 |
| DE | 3033097 | 4/1982 |
| DE | 3112993 | 10/1982 |
| FR | 484817 | 11/1917 |
| FR | 1052130 | 1/1954 |
| FR | 2315248 | 1/1977 |
| FR | 2484817 | 12/1981 |

* cited by examiner

Primary Examiner—Reginald L. Alexander
(74) Attorney, Agent, or Firm—Lerner, David, Littenberg, Krumholz & Mentlik, LLP

(57) ABSTRACT

A pressure cooking apparatus has a locking device for locking the lid of the apparatus relative to the pan of the apparatus. The lid includes lid ramps for engaging pan ramps on the pan. The locking device is mounted to move along the wall of the pan in an inter-ramp zone so that the locking device has a locking position flush against a lateral edge of a pan ramp.

20 Claims, 5 Drawing Sheets

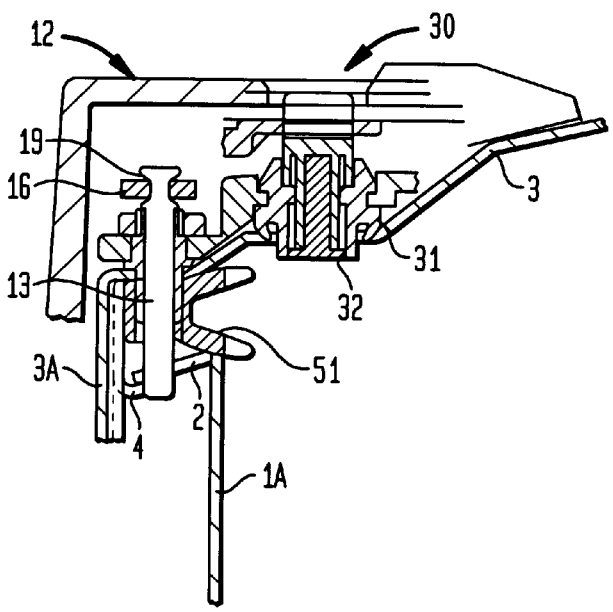
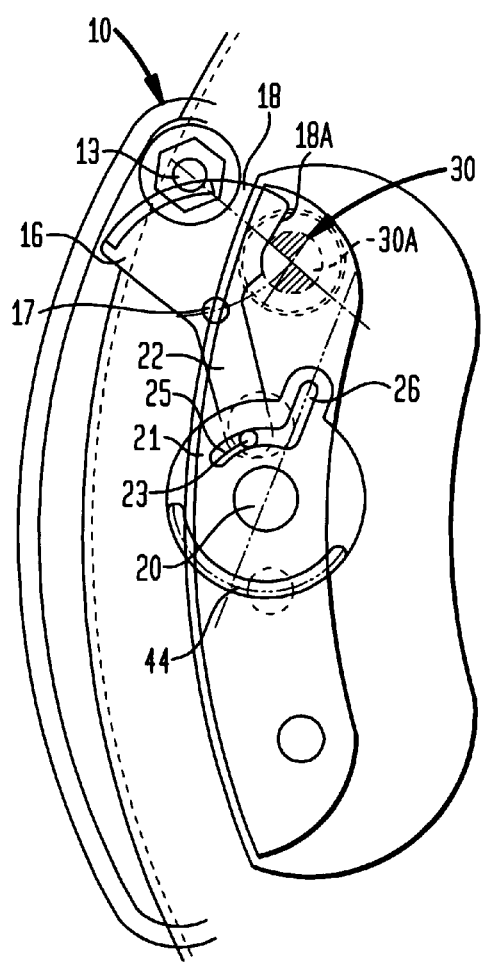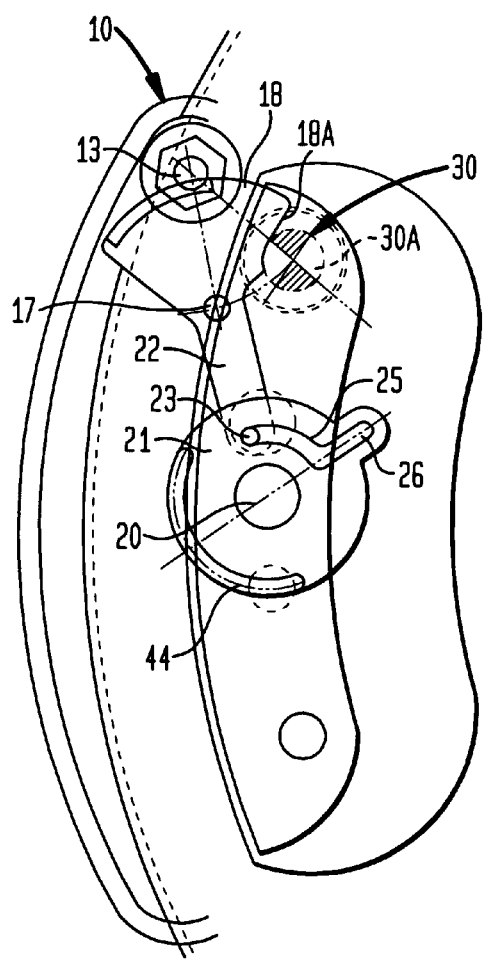

DEVICE FOR LOCKING/UNLOCKING A PRESSURE COOKER WITH LUG-BAYONET TYPE CLOSURE

FIELD OF THE INVENTION

The present invention relates to pressure cooking appliances.

BACKGROUND OF THE INVENTION

Generally, the locking/unlocking devices of "bayonet" type pressure cookers use the alignment between a handle of the pan and a handle of the lid to trigger displacement of a latch.

In one example, a pressure cooker has a handle with a member for locking the lid relative to the pan. The member is movable in a radial direction and has an orifice that, in the closed position, receives an operating valve freely therethrough when the lid is properly closed.

Such locking arrangements require compliance with a chain of multiple design dimensions, that is difficult to achieve. This chain of dimensions comprises dimensions for a large stack of components such as the pan, the fixing pin for the handles, the locking member, the handle of the lid, the lid, the compression of the gasket, etc. This gives rise to major dimensional constraints on the manufacturer, and naturally constitutes a significant industrial drawback. In addition, on "bayonet" type pressure cookers, there is only one single position for relative locking between the lid and the pan.

French Patent No. 1,052,130 describes a means for locking the lid relative to the pan. The locking means extends substantially parallel to the wall of the pan and is vertically movable. The locking means is mounted on the lid and is associated with control means, in association with a rated operating valve. The locking means is designed to penetrate into a cavity provided in the handle of the appliance to lock the pressure cooker.

Apart from the relatively rudimentary level of safety that it provides, such a system suffers from the drawback of still requiring compliance with a considerable chain of design dimensions, and such a known device also has only one single closure position.

SUMMARY OF THE INVENTION

In one aspect of the present invention, a device for locking/unlocking a pressure cooking appliance with bayonet closure comprises:

a pan having pan ramps;

a lid having lid ramps;

rotary abutment means for preventing rotation of the lid relative to the pan, the rotary abutment means being placed so that, in the closed position, the lid ramps engage the pan ramps and the lid and the pan are prevented from rotating in the direction of rotation that corresponds to closing the appliance; and locking means for locking the lid relative to the pan, the locking means being mounted to move on the appliance under drive from control means suitable for being actuated by the user between at least one unlocking position enabling the appliance to be opened and at least one locking position in which relative rotation between the pan and the lid is prevented;

the locking means being mounted to move in translation along the wall of the pan in the inter-ramp zone so that, in the locking position, the locking means is in a flush position against the lateral edge of a pan ramp.

BRIEF DESCRIPTION OF THE DRAWINGS

These and other aspects, features and advantages of the present invention will become better understood with regard to the following description, appended claims, and accompanying drawings, given purely by way of non-limiting illustration, and in which:

FIG. 9 is a fragmentary cross-sectional view showing the locked position of the pressure cooker in accordance with the embodiment of FIGS. 1–8;

FIG. 10 is a fragmentary plan view showing the pressure cooker in accordance with the embodiment of FIGS. 1–9 in a first rated position of the operating valve; and FIG. 11 is a fragmentary plan view showing the pressure cooker in accordance with the embodiment of FIGS. 1–10 in a second rated position of the operating valve.

DETAILED DESCRIPTION

FIGS. 1 through 11 show a pressure cooker in accordance with an embodiment of the invention. The pressure cooking appliance has a bayonet closure.

Figure 3:
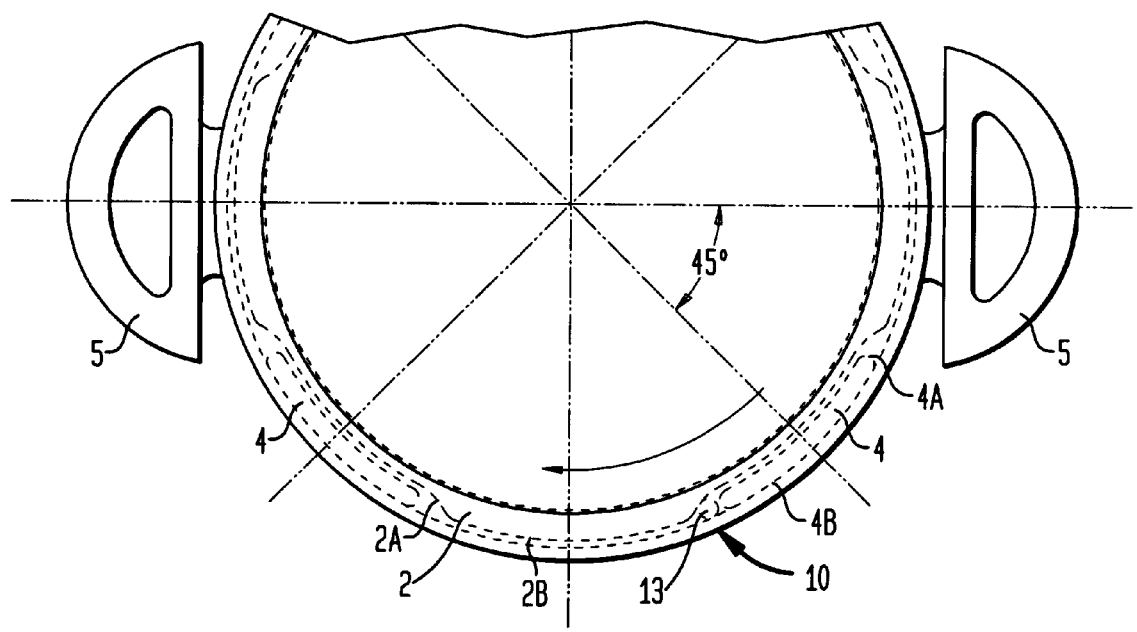
FIG. 3 is a fragmentary plan view of a pressure cooker in accordance with the embodiment of FIGS. 1–2.

The pressure cooker comprises a pan 1 that is generally cylindrical, being defined by a pan wall 1A. The pan wall 1A has a top portion and a series of pan ramps 2 in the top portion for co-operating with a lid 3. The lid has a periphery with lid ramps 4 to form a bayonet closure with the pan ramps 2. The pan ramps 2 and the lid ramps 4 have profiles each including two lateral edges 2A, 4A and a peripheral edge 22, 4B (FIG. 3). The pan 1 and lid 3 have an open position and a closed position, with respect to one another. When the lid is rotated with respect to the pan, in a closing direction, the pan ramps 2 engage the lid ramps 4.

The pan 1 and the lid 3 may be made from metal, such as stainless steel or aluminum, and may be made by stamping, for example.

For handling purposes, the pressure cooker is fitted with handle members, e.g. a pair of handles 5 secured to the pan and fixed in diametrically-opposite positions on the wall 1A. In the embodiment shown in FIGS. 1 to 11, the lid 3 is provided on its outer top face, substantially in the middle thereof, with a handle 6 enabling the lid 3 to be held and to be rotated.

Figure 1:
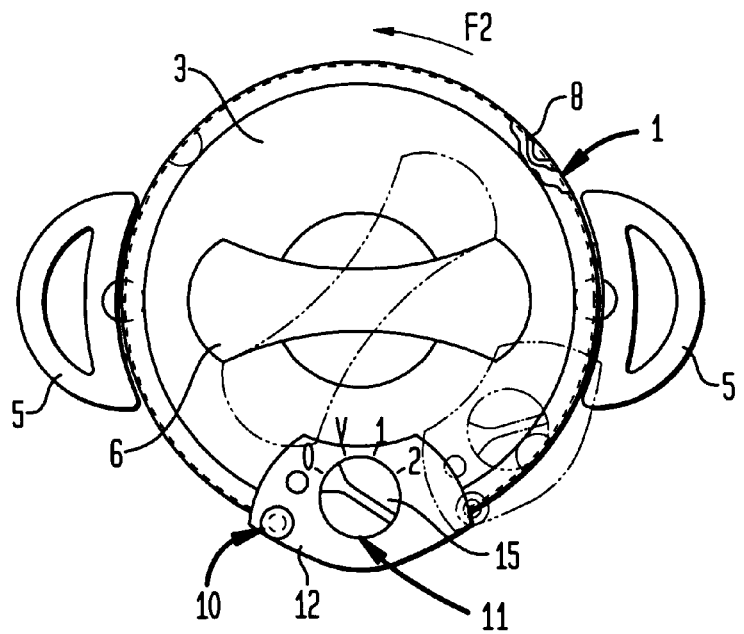
FIG. 1 is an overall plan view of a pressure cooker in accordance with an embodiment of the invention.

The pressure cooker includes rotary abutment means for preventing the lid 3 from rotating relative to the pan 1. The abutment means is disposed so that, in the closed position, the lid ramp s 4 engage the pan ramps 2 and the lid 3 and the pan 1 are prevented from rotating in the closing direction. In certain preferred embodiments, the rotary abutment means comprises a series of complementary shapes. For example, as shown in FIG. 1, a peripheral portion of the lid 3 has a notch or indentation 8 (FIG. 1). The indentation is formed in the peripheral portion of the lid 3 for coming into abutment against a pan ramp 2 when the pan ramp 2 is rotated from a starting position.

The pressure cooker also includes locking means 10 for locking the lid 3 relative to the pan 1. The locking means 10 is mounted for motion relative to the pressure cooker, under drive from a control means 11. The control means 11 is arranged so as to be actuatable by the user between at least one unlocking position enabling the appliance to be opened, and at least one locking position in which rotation of the lid 3 relative to the pan 1 is prevented. The locking means 10 prevents the lid 3 from rotating relative to the pan 1 in the opening direction. The locking means 10, in association with the abutment means 8, ensures that the pan and the lid a re locked together by preventing any relative rotation between these two pieces.

Figure 2:
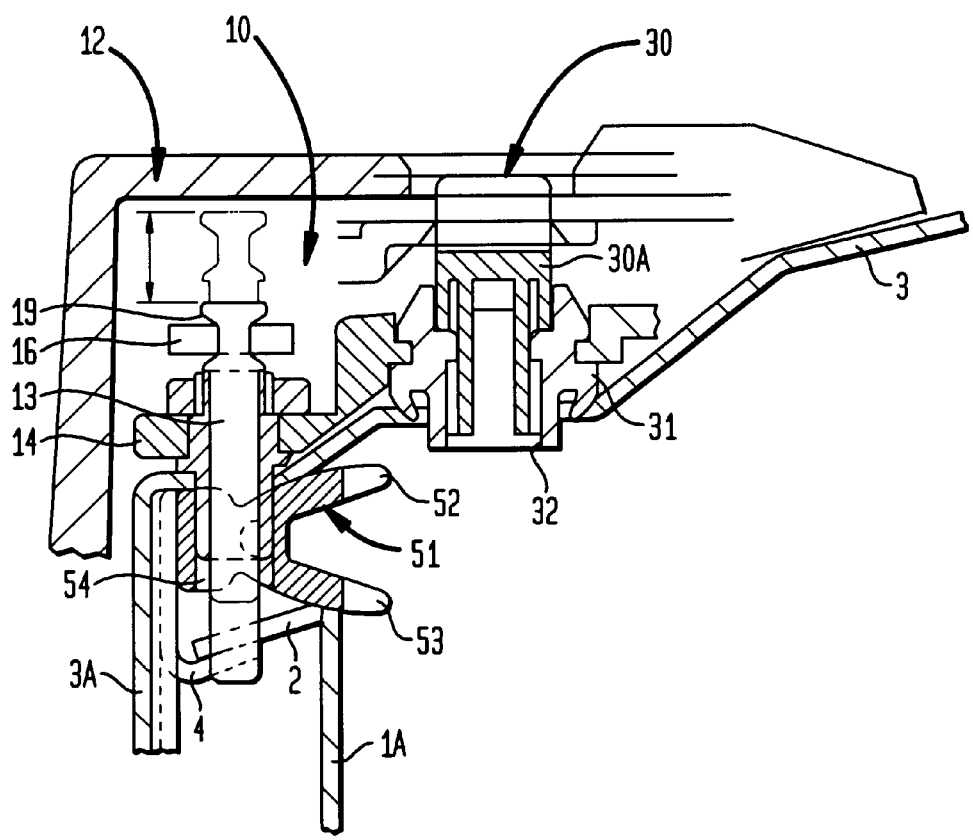
FIG. 2 is a fragmentary cross-sectional view showing a detail of the embodiment of FIG. 1.

The locking means 10 is mounted for motion in translation along the wall of the pan wall 1A in an inter-ramp zone 7 on the pan (FIGS. 2, 4, 5, and 9) so that in the locking position the locking means is in the vicinity of the lateral edge 2A of one of the p an ramps 2. In the locking position, the locking means 10 extends substantially parallel to the wall of the pan 1, on the outside of the pan 1. The locking means 10 is located at a distance from the wall of the pan in the zone between the diameter defined by the top edge of the pan wall 1A and the diameter defined by the drop edge 3A of the lid 3 (FIG. 2).

Figure 4:
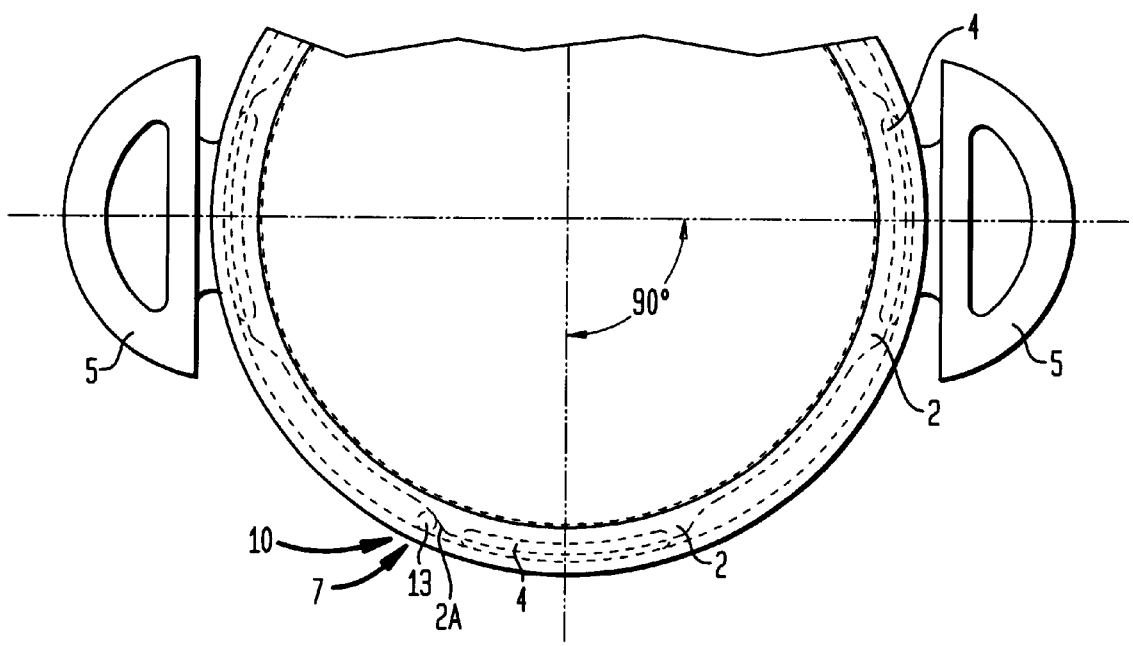
FIG. 4 is a fragmentary plan view showing the pressure cooker in accordance with the embodiment of FIGS. 1–3 in a closed and locked position.

In operation, and as can be seen in FIGS. 3 and 4, for example, the locking means 10 moves into the locking position shown in FIG. 4 when the lid 3 is in its closed position defined by the abutment means 8. In this position, the pan ramps 2 and the lid ramps 4 are superposed and in engagement and the inter-r amp zone 7 is empty. The locking means 10 is moved into the inter-ramp zone 7 so that the locking means is close to and in a position flush with the lateral edge 2A of one of the pan ramps 2. Preferably, the locking means 10 moves vertically. The lid 3 and the pan 1 are prevented from rotating relative to each other in both directions of rotation.

Preferably, the locking means 10 and the control means 11 are integrated into a block 12, or mounted on a block 12 mounted on the lid 3. FIGS. 2, 5, 7, and 9). The block 12 is preferably a removable unitary assembly.

Figure 5:
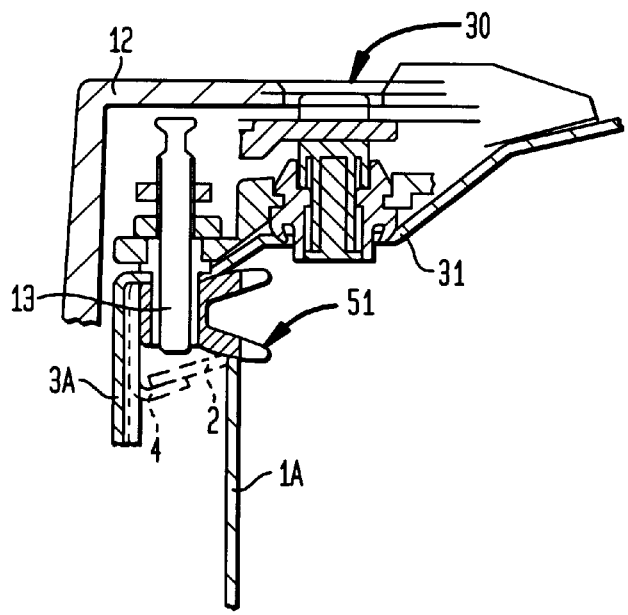
FIG. 5 is a fragmentary cross-sectional view taken along line 5—5 of FIG. 6 showing the pressure cooker in accordance with the embodiment of FIGS. 1–4 in an open position.

Preferably, the locking means 10 comprises a pin. The pin may, for example, comprise a cylindrical metal pin. The pin is mounted on the lid 3 substantially parallel to the wall of the pan 1, and is mechanically and functionally connected to the control means 11. The pin 13 may be carried by a support plate 14. (FIGS. 2, 5 and 9).

The control means 11 includes a selector knob 15 mounted for rotation on the block 12 between at least two positions. Preferably, the knob is mounted for rotation between three or four positions. (FIGS. 1 and 7). The knob acts directly or indirectly on the locking means 10. In a preferred variant of the invention, the selector knob 15 acts indirectly on the control means 11. For example, the knob 15 may act indirectly on the pin 13, via a lever (e.g. FIGS. 6, 8, 10, and 11) hinged between said knob and said control means, and providing a mechanical interface between the selector knob 15 and the locking means 10. The movement in translation of the pin 13 in a substantially vertical direction is obtained by rotating the lever 16. The lever is hinged at or near a halfway point between the two ends of the lever by a pivot 17. The lever has a first end that flares to form a circular arc 18 and a second end 22. The arc 18 is designed to engage the control means 10, and in particular the top portion of the pin 13. Preferably, the arc 18 engages a notch 19 in the pin 13. (FIG. 2) The notch has a substantially helical shape so that the pin 13 has a sloping control ramp in the notch 19. In certain embodiments, rotation of the lever about its pivot 17 moves the pin 13 in translation from its locking position to its unlocking position, and vice versa. In other embodiments, the sloping control ramp is formed on the arc 18 for moving the pin 13. In other embodiments, a slot in the arc 18 engages a ramp on the pin 13. The mounting is designed so that the end of the lever engages and co-operates with the pin 13 via helically-shaped co-operation means disposed respectively on the pin 13 and on a longitudinal end of the lever 16.

Figure 6:
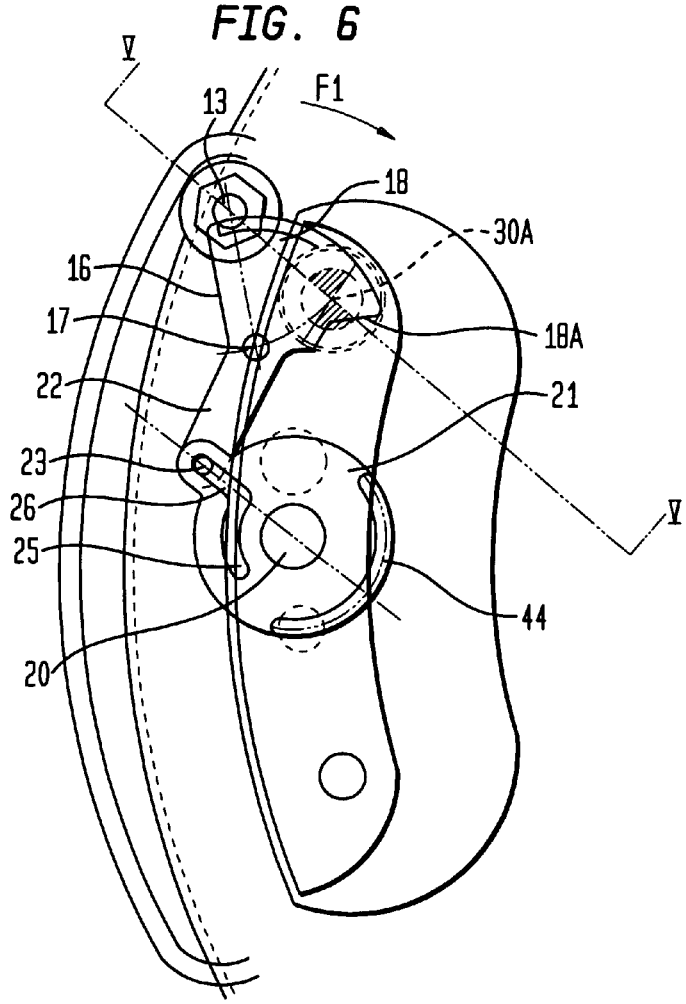
FIG. 6 is a plan view in partial section of the pressure cooker in accordance with the embodiment of FIGS. 1–5 in the open position.
Figure 7:
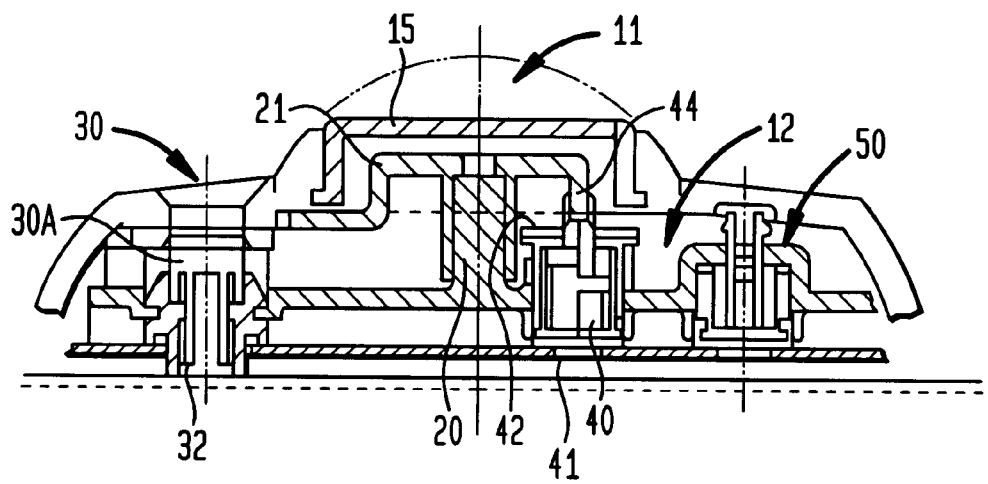
FIG. 7 is a fragmentary cross-sectional view showing the pressure cooker in accordance with the embodiment of FIGS. 1–6 in a locked position without pressure.

As shown for example in FIG. 7 and in FIGS. 6, 8, 10, and 11, the block 12 has a substantially vertical control pin 20 and the selector knob 15 is mounted to rotate on the block 12 via the pin 20. A collar 21 is secured to the pin 20 and is of sufficient size to extend over and cover at least part of the second end 22 of the pivoted lever 16, opposite the arc 18, as shown in FIG. 6. The collar 21 extends over an angular sector of rotation. The collar 21 has a guide slot with a circular portion 25 and a radial portion 26. The second end 22 extends in part beneath the collar 21, and towards its edge includes a vertical finger 23 mounted to engage the guide slot of the collar 21. The knob 15 interacts with the collar 21. By means of this configuration, the vertical finger 23 is guided in the guide slot, and depending on how the selector knob is rotated, the lever 16 can be caused to move in rotation about its pivot axis 17.

Preferably, a pressure indicator 30 is mounted to move freely on the lid 3. Preferably the indicator 30 is mounted in or on the block 12 in a seat so that it moves between a first, high pressure position and a second, low pressure position, depending on the pressure that exists within the appliance.

The pressure indicator 30 comprises a cylindrical peg 30A mounted to move in vertical translation in a seat 31, for example. The seat 31 for the peg 30A is mounted to a plate 14 of the block 12. The seat 31 has a bottom orifice 32 open through the lid 3 to the interior of the pan of the pressure cooker. The cylindrical peg 30A and the seat 31 are shaped so that when the cylindrical peg 30A is in a first position, a leak proof seal is formed, and in a second position, pressure is allowed to leak out. For example, the peg 30A has a higher position in which the peg 30A presses against the seat 31 to form a leak proof seal. In a lower position, the peg 30A allows pressure to leak out. The lower position thus corresponds to a pressure-leakage position.

As shown in particular in FIGS. 6, 8, 10, and 11, the pressure indicator 30, the locking means 10, and the control means 11 are organized and mounted relative to one another in such a manner that:

when the control means 11 is in the unlocking position and the locking means 10 is in the unlocking position the control means 11 prevents the pressure indicator 30 from moving away from its second position; and when the control means 11 is in the locking position and the locking means 10 is in the locking position, the control means 11 allows the pressure indicator 30 to move; however, the control means and locking means may be held in the locking position if the indicator 30 is in its first position.

In embodiments having a pressure indicator 30, the control means 11 comprises, as described above, a selector knob mechanically and functionally associated with the locking means 10 via the pivoted lever 16 acting via its end 18 on the locking means 10 to displace it. The knob 15 has an unlocking position "O" and a locking position "V" as shown in FIG. 1.

Figure 8:
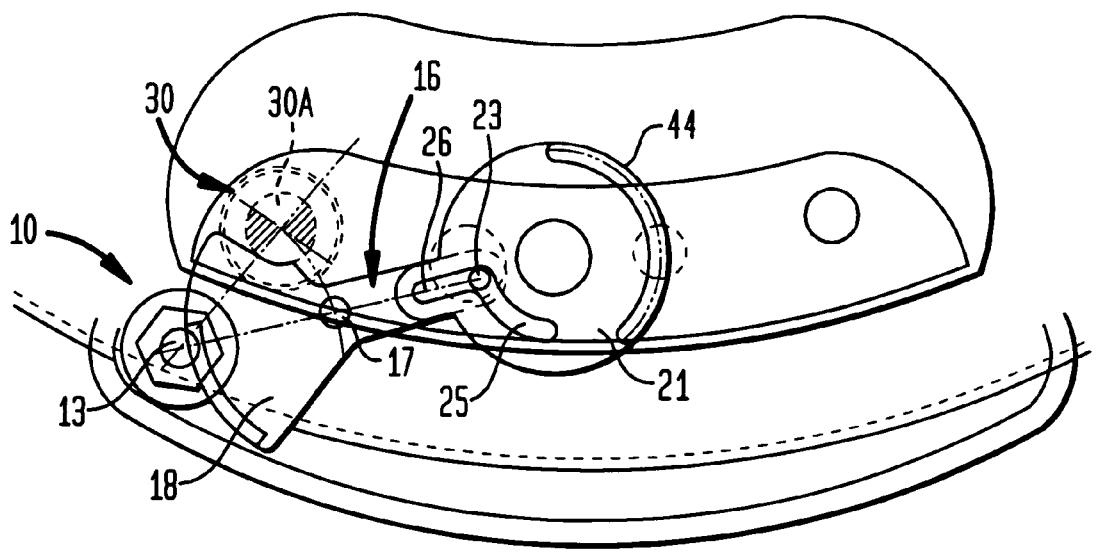
FIG. 8 is a fragmentary plan view showing the pressure cooker in accordance with the embodiment of FIGS. 1–7 in a locked position without pressure.

The pressure indicator 30 is mounted relative to the pivoted lever 16 so that its arc 18 covers peg 30A of pressure indicator 30 when the selector knob 15 is in the unlocking position (FIG. 6) to prevent the pressure indicator 30 from rising. In order to reach this unlocking position, the pivoted lever 16 has been pivoted in the direction marked F1 in FIG. 6, moving the pin 13 vertically upwards so that the lever covers the cylindrical peg 30A while the cylindrical peg 30A is in the lower position. In this position, the pressure indicator 30 is in its pressure-leakage position and is prevented from moving by the presence of the arc 18. In this position, the pressure cooker may be opened or closed. The locking position, is shown in FIG. 8. Preferably, the arc 18 has a curved side edge 18A, e.g. in the form of a concave circular arc, corresponding to the shape of the periphery of the cylindrical peg 30A. In the locking position, the curved edge 18A engages the peg 30A to lock the lever against the pressure indicator. In this position, the pressure indicator is free to move. The positions shown in FIGS. 8, 10, and 11 correspond respectively to the positions marked V, I, and II in FIG. 1. In each of these positions, the locking means 10 is in its locking position and the pressure indicator 30 can move upwards freely. If a certain amount of pressure exists within the enclosure of the pressure cooker, it becomes impossible for the user to place the selector knob 15 in the opening position since the pressure indicator 30 in its high position limits rotation of the pivoted lever 16.

In preferred embodiments of the invention, the selector knob 15 is mechanically and functionally associated with a rated operating valve 40 (FIG. 7) for the purpose of setting a rating. The rated operating valve 40 is mounted in or on the block 12, and is mounted to move freely within a seat. The operating valve may be resiliently mounted in the seat utilizing a helical spring, for example. The rated operating valve 40 is subjected to the internal pressure that exists inside the interior of the pressure cooker via an orifice 41 situated towards its bottom portion and opening out into the pan 1. The top portion 42 of the rated operating valve 40 is in contact with the selector knob 15 so as to be driven thereby. In the embodiment shown in FIG. 7, the top portion 42 of the valve 40 has a cam profile 44. The collar 21 is arranged to act upon the cam profile 44 of valve 40. The selector knob 15 is in contact with the rated operating valve 40 by means of the collar 21 which acts via the cam profile 44.

Advantageously, the cam profile 44 acts against the resilient mounting of the valve in at least two set positions of the knob 15. Thus, the selector knob 15 acts on the rated operating valve 40 in two positions corresponding respectively to the following:
  the locking position V (e.g. FIG. 1) in order to release the valve 40; and
  a first compression position representing a first rated value having a first operating pressure, e.g. corresponding to the appliance operating at a relative pressure up to about 550 millibars.

In preferred embodiments, the selector knob 15 acts on the rated operating valve 40 in a second compression position (FIG. 11) representing a second rating value having a second operating pressure, e.g. corresponding to the appliance operating up to a pressure of about 900 millibars. For example, in the locking position, the cam profile 44 is flush with the top portion 42 of the valve 40 in such a manner as to exert no compression on the resilient means, thereby releasing the rated operating valve 40. The cam profile 44 is regularly inclined obliquely so as to compress the resilient means by increasing amounts corresponding to the two rated positions as defined above and to the two rotary positions of the selector knob 15. In other embodiments, the operating valve and knob 15 have more than three operating positions.

Finally, and as shown in FIG. 7 for example, the safety device of the invention can also include auxiliary safety devices, such as a safety valve 50.

The locking means 10, the control means 11, and the rated operating valve 40 may be integrated in a unitary assembly including the block 12 which is removably mounted on the lid 3 by any appropriate means, e.g. by screws.

In preferred embodiments, as shown in FIGS. 2, 5, and 9, for example, the locking means 10, and specifically the pin 13, passes through a sealing gasket 51 mounted between the lid 3 and the pan 1. Advantageously, the pin 13 passes through the sealing gasket 51 to act as means for indexing said gasket and for preventing it from rotating in the lid 3. The sealing gasket 51 is made of an elastomer material and has two lips 52 and 53, for example. The sealing gasket 51 has a hole 54 formed through its main body in such a manner that in the unlocking position, the sealing gasket 51 is engaged on the pin 13 via the hole 54. This prevents the sealing gasket 51 from rotating in the lid 3.

The pressure cooking appliance operates as follows.

To close and open the appliance, the selector knob must be moved by the user into its opening position, such as the position indicated "0", as shown in FIG. 1. In this position (e.g. FIGS. 5 and 6), the pin 13 is in its higher position, and the lever 16 is in a position overlying the pressure indicator 30. Thus, the pressure indicator is its lower position since the pivoted latch 16 limits vertical displacement thereof. The pressure inside the appliance cannot be increased since the pressure indicator 30 is in its low position in which it is possible for pressure to leak out between the pan 1 and the lid 3. It is thus possible for the user to open and close the appliance, without taking any particular precautions, by rotating the lid 30, e.g. in the direction F2 shown in FIG. 1, so as to reach the position shown in dashed lines in FIG. 1.

To close the appliance, the user must firstly position the lid 3 on the pan 1 in the position shown in dashed lines in FIG. 1. The user then rotates the lid 3 in the direction opposite to arrow F2 so that it takes up the position shown in continuous lines in FIG. 1. To close the appliance, the selector knob 15 (which during all the preceding operations has been in the position marked 0) is turned by the user into the locking position, such as the position marked V, as shown in FIG. 8. The selector knob 15 rotates the pivoted lever 16 which first uncovers the pressure indicator 30, and then moves the pin 13 downwards. The movement of the arc 18 in the guide notch of the pin 13 causes the pin 13 to move downwards substantially vertically so that the pin 13 is flush against the lateral edge 2A of the pan ramp 2 and the lid 3 is locked against rotation relative to the pan 1. (FIG. 4). Furthermore, the pressure indicator 30 is free to move upwards. The rated operating valve 40 is free to move, which prevents the pressure inside the pressure cooker from rising.

In order to allow pressure to rise, the user must move the selector knob to the first rated position (FIG. 10). While moving into said position, the pivoted lever 16 remains stationary since the finger 23 of the lever can move freely in the circular portion 23 of the guide slot in the collar 21. The rated operation valve 40 is now elastically compressed and the pressure inside the appliance can rise. Depending on the type of cooking desired, the user can also move the selector knob 15 to the second rating position, as shown in FIG. 11, for example. In this second position, the pin 13 is still naturally in its locking position since the pivoted lever 16 has not moved, the finger 23 of the lever an end position in the guide slot of the collar. Furthermore, with the pressure indicator 30 in the higher position because of the pressure, it is impossible for the user to place the selector knob 15 in the opening position. While in the higher position, the pressure indicator 30 prevents the pivoted lever 16 from rotating, thereby causing it to act as a latch.

If the user seeks to open the appliance, the selector knob 15 is moved to the locking position, such as the position indicated V where the rated operating valve 40 is free to allow steam to escape, thereby causing the pressure contained inside the appliance to drop once the pressure has dropped below a value of about 0.5 kPa, for example, the pressure indicator 30 returns to its lower position, thereby enabling the user to turn the selector knob 15 into the opening position 0. The pivoted lever 16 can now be rotated to enable the pin 13 to move upwards in translation under drive from the pivoted lever 16. The pin 13 thus reaches its unlocking position, thereby enabling the pressure cooker to be opened in complete safety, all pressure having been evacuated previously.

The pan and the lid are locked together directly and complete safety for the appliance is obtained since the pressure cannot rise inside the appliance if it is poorly closed, and it can be opened only by necessarily moving the selector knob to the locking position V in which any remaining excess pressure within the pressure cooker is evacuated. In addition, the appliance can be opened only if the internal pressure within the appliance approaches zero. The locking mechanism is also independent of the handles of the pan, thereby simplifying construction of the appliance.

What is claimed is:

1. A pressurized cooking apparatus, comprising:
   a) a pan having a wall and pan ramps extending outwardly from said wall;
   b) a lid having lid ramps, said lid ramps being arranged on said lid so as to engage said pan ramps when said lid is in a closed position on said pan; and
   c) locking means for locking said lid relative to said pan, said locking means being mounted to move along said wall in an inter-ramp zone so that said locking means has a locking position flush against a lateral edge of one of said pan ramps.

2. The apparatus of claim 1, wherein said locking means comprises a pin.

3. The apparatus of claim 1, wherein said locking means is mounted to move on the appliance under drive from control means, said control means having at least one unlocking position and at least one locking position in which relative rotation between said pan and said lid is prevented.

4. The apparatus of claim 3, wherein said locking means is in said inter-ramp zone when said control means is in said at least one locking position.

5. The apparatus of claim 2, wherein said locking means and said control means are mounted on said lid.

6. The apparatus of claim 3, further comprising a lever, said control means engaging said lever and said lever engaging said locking means.

7. The apparatus of claim 6, wherein movement of said control means to said at least one locking position moves said lever so that said locking means moves into said inter-ramp zone.

8. The apparatus of claim 6, wherein said locking means comprises a pin, said control means comprises a selector knob, and said lever has a first end for co-operating with said pin so that movement of said selector knob moves said lever and movement of said lever moves said pin.

9. The apparatus of claim 8, wherein said pin has a substantially helical notch and said first end of said lever engages said notch so that movement of said lever moves said pin into and out of said inter-ramp zone.

10. The apparatus of claim 1, further comprising a sealing gasket mounted between the lid and the pan, said sealing gasket having a hole, said locking means passing through said hole.

11. The apparatus of claim 6, wherein said locking means, said control means, and said lever form part of an assembly that is removably mounted on the apparatus.

12. The apparatus of claim 3, further comprising a pressure indicator having a first position and a second position, said pressure indicator being mounted on said apparatus so that a seal against pressure leakage is formed when said pressure indicator is in said first position and said pressure indicator allows pressure to leak out of said apparatus in said second position.

13. The apparatus of claim 12, wherein said control means engages said pressure indicator in said at least one unlocking position of said control means.

14. The apparatus of claim 13, wherein said lever engages said pressure indicator in said at least one unlocking position of said control means so that said pressure indicator is prevented from moving from said second position to said first position.

15. The apparatus of claim 14, wherein said lever allows said pressure indicator to move to said first position when said control means is in said at least one locking position.

16. The apparatus of claim 15, wherein said lever includes an edge and said pressure indicator engages said edge in said at least one locking, position of said control means so that said lever is locked against said pressure indicator and said control means is prevented from moving to said at least one unlocking position of said control means.

17. The apparatus of claim 15, wherein said at least one locking position of said control means includes a first position corresponding to a first rated value having a first operating pressure for said apparatus.

18. The apparatus of claim 17, wherein said at least one locking position of said control means includes a second position corresponding to a second rated value having a second operating pressure for said apparatus.

19. The apparatus of claim 1, wherein said lid ramps are arranged so that when said lid is rotated relative to said pan in a first direction, said pan ramps engage said lid ramps.

20. The apparatus of claim 19, further comprising abutment means for preventing said lid from rotating relative to said pan in said first direction when said lid is in said closed position.

* * * * *

UNITED STATES PATENT AND TRADEMARK OFFICE
CERTIFICATE OF CORRECTION

PATENT NO. : 6,425,320 B1 Page 1 of 1
DATED : July 30, 2002
INVENTOR(S) : Eric Chameroy, Eric Christian Jacques Rhetat and Eric Laurent Baraille It is certified that error appears in the above-identified patent and that said Letters Patent is hereby corrected as shown below:

Title page, Item [54] and Column 1, line 1,
The title should read -- DEVICE FOR LOCKING/UNLOCKIING A PRESSURE COOKING APPLIANCE HAVING A BAYONET CLOSURE --

Column 1,
Line 21, "dimensions, that" should read -- dimensions that --

Column 3,
Line 23, "a re" should read -- are --
Line 30, "p an" should read -- pan --
Line 42, "inter-r amp" should read -- inter-ramp --
Line 52, "FIGS. 2, 5, 7, and 9)" should read -- (FIGS. 2, 5, 7, and 9) --

Column 5,
Line 42, "The rated operating" should start a new paragraph on line 43.

Column 6,
Line 40, "indicator 30 is its" should read -- indicator 30 is in its --.

Column 7,
Line 11, "position since" should read -- position and since --
Line 12, "lever an end" should read -- lever has an end --

Column 8,
Line 46, "locking, position" should read -- locking position --

Signed and Sealed this

Twenty-seventh Day of May, 2003

JAMES E. ROGAN
*Director of the United States Patent and Trademark Office*